United States Patent
Baek

(10) Patent No.: US 8,321,631 B2
(45) Date of Patent: Nov. 27, 2012

(54) PARITY CALCULATION AND JOURNAL GENERATION IN A STORAGE DEVICE WITH MULTIPLE STORAGE MEDIA

(75) Inventor: Sung Hoon Baek, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 12/755,364

(22) Filed: Apr. 6, 2010

(65) Prior Publication Data

US 2011/0035549 A1    Feb. 10, 2011

(30) Foreign Application Priority Data

Aug. 4, 2009  (KR) .................. 10-2009-0071663

(51) Int. Cl.
*G06F 12/16* (2006.01)
*G06F 11/10* (2006.01)
(52) U.S. Cl. .......... 711/114; 711/E12.009; 711/E12.103
(58) Field of Classification Search .............. 711/114, 711/E12.009, E12.103
See application file for complete search history.

(56) References Cited

U.S. PATENT DOCUMENTS

| | | | |
|---|---|---|---|
| 7,024,586 B2 | 4/2006 | Kleiman et al. | |
| 2002/0108017 A1* | 8/2002 | Kenchammana-Hoskote et al. | 711/113 |
| 2003/0236943 A1* | 12/2003 | Delaney | 711/114 |
| 2005/0144381 A1* | 6/2005 | Corrado | 711/114 |
| 2006/0288161 A1* | 12/2006 | Cavallo | 711/114 |
| 2008/0022150 A1* | 1/2008 | Forhan et al. | 714/6 |
| 2008/0222214 A1* | 9/2008 | Tokuda et al. | 707/202 |
| 2009/0106585 A1* | 4/2009 | Kitamura et al. | 714/6 |

FOREIGN PATENT DOCUMENTS

| | | |
|---|---|---|
| JP | 2005-099998 | 4/2005 |
| JP | 2005-332123 | 12/2005 |
| JP | 2008-217395 | 9/2008 |
| JP | 2008-225616 | 9/2008 |
| JP | 2008-269638 | 11/2008 |
| KR | 10-2004-0056644 | 7/2004 |
| KR | 10-2007-0061345 | 6/2007 |

* cited by examiner

*Primary Examiner* — Hal Schnee
(74) *Attorney, Agent, or Firm* — NSIP Law

(57) ABSTRACT

A data storage device is provided. The data storage device may include a buffer memory, a storage medium, and a controller. The buffer memory may be configured to sequentially store written data blocks received from a host. The storage medium may be configured to include at least one drive. The controller may be configured to calculate first parity data for data selected from the written data in the buffer memory, generate journaling data, and control the generated journaling data to be stored in the storage medium. The data storage device may decrease a number of inputs/outputs used for a parity calculation to thereby reduce overhead.

13 Claims, 4 Drawing Sheets

PARITY CALCULATION AND JOURNAL GENERATION IN A STORAGE DEVICE WITH MULTIPLE STORAGE MEDIA

CROSS-REFERENCE TO RELATED APPLICATION(S)

This application claims the benefit under 35 U.S.C. §119(a) of Korean Patent Application No. 10-2009-0071663, filed on Aug. 4, 2009, in the Korean Intellectual Property Office, the entire disclosure of which is incorporated herein by reference for all purposes.

BACKGROUND

1. Field

The following description relates to a storage device, and more particularly, to a data storage device that may decrease a number of inputs/outputs used for a parity calculation to reduce overhead.

2. Description of Related Art

A data storage device such as a redundant array of independent disks (RAID) system may include a plurality of independent storage mediums into a single storage medium to thereby provide distributed storage and enable simultaneous access to the plurality of independent storage mediums. The RAID system may enhance an input/output characteristic and make the plurality of independent storage mediums appear as a single drive from a viewpoint of a host to thereby embody a large capacity storage device.

The RAID system may simultaneously include auxiliary data such as duplicate drive data or parity data, for example. Accordingly, in the case any one storage medium included in the RAID system malfunctions, data may be automatically recovered, thereby enhancing system availability.

The data storage device such as the RAID system including parity data may update the parity data every time data is written. However, updating the parity data in log data blocks may cause increased overhead.

SUMMARY

In one general aspect, there is provided a data storage device. The data storage device may include a buffer memory configured to sequentially store written data blocks that are received from a host, a storage medium configured to include at least one drive, and a controller configured to calculate first parity data for selected data that are selected from the written data in the buffer memory, generate journaling data including the selected data and the first parity data, and control the generated journaling data to be stored in the storage medium.

The controller may control garbage collected data, collected from the journaling data, to be stored in the storage medium.

The storage medium may include a first storage medium to store the journaling data, and a second storage medium to store the garbage collected data. The controller may collect latest valid data from the journaling data stored in the first storage medium and existing data stored in the second storage medium to calculate second parity data of the latest valid data.

The first storage medium and the second storage medium may be the same type of a redundant array of independent disks (RAID)-based storage medium that includes one or more drives, and may be logically separable from each other.

The controller may control the latest valid data and the second parity data to be stored in the second storage medium.

The first storage medium may include a journaling area to store the journaling data, and a log data area to store log data that contains the metadata of the selected data and the first parity data.

Also, the controller may control the log data to be overwritten in the log data area.

The log data may include at least one of storage location information within the journaling area, storage location information within the second storage medium, data update information, and storage time information with respect to the selected data and the first parity data.

The controller may analyze the valid data based on the selected data and the first parity data constituting the journaling data stored in the first storage medium, and existing data stored in the second storage medium.

The controller may calculate the second parity data based on the latest valid data and the journaling data that is temporarily stored in the buffer memory.

After storing the latest valid data in the second storage medium, the controller may invalidate the first parity data and the selected data stored in the first storage medium corresponding.

The controller may remap the address of the latest second parity data and the latest valid data of the second storage medium to the addresses of the previously existing second parity data and the previously existing data that are invalidated by the latest second parity and the latest valid data.

After remapping the addresses of the latest second parity data and the latest valid data stored in the second storage medium, the controller may invalidate or erase the previously existing second parity data and the previously existing data stored in the second storage medium.

When a size of the selected data does not match a stripe size, the controller may include padding data to generate the journaling data matching the stripe size.

In another general aspect, there is provided a data storage method including sequentially storing, in a buffer memory, written data blocks that are received from a host, calculating, by a controller, first parity data for selected data that are selected from the written data in the buffer memory, generating, by the controller, journaling data including the selected data and the first parity data, and controlling, by the controller, the generated journaling data to be stored in a storage medium that includes at least one drive.

Other features and aspects will be apparent from the following detailed description, the drawings, and the claims.

Figure 1:
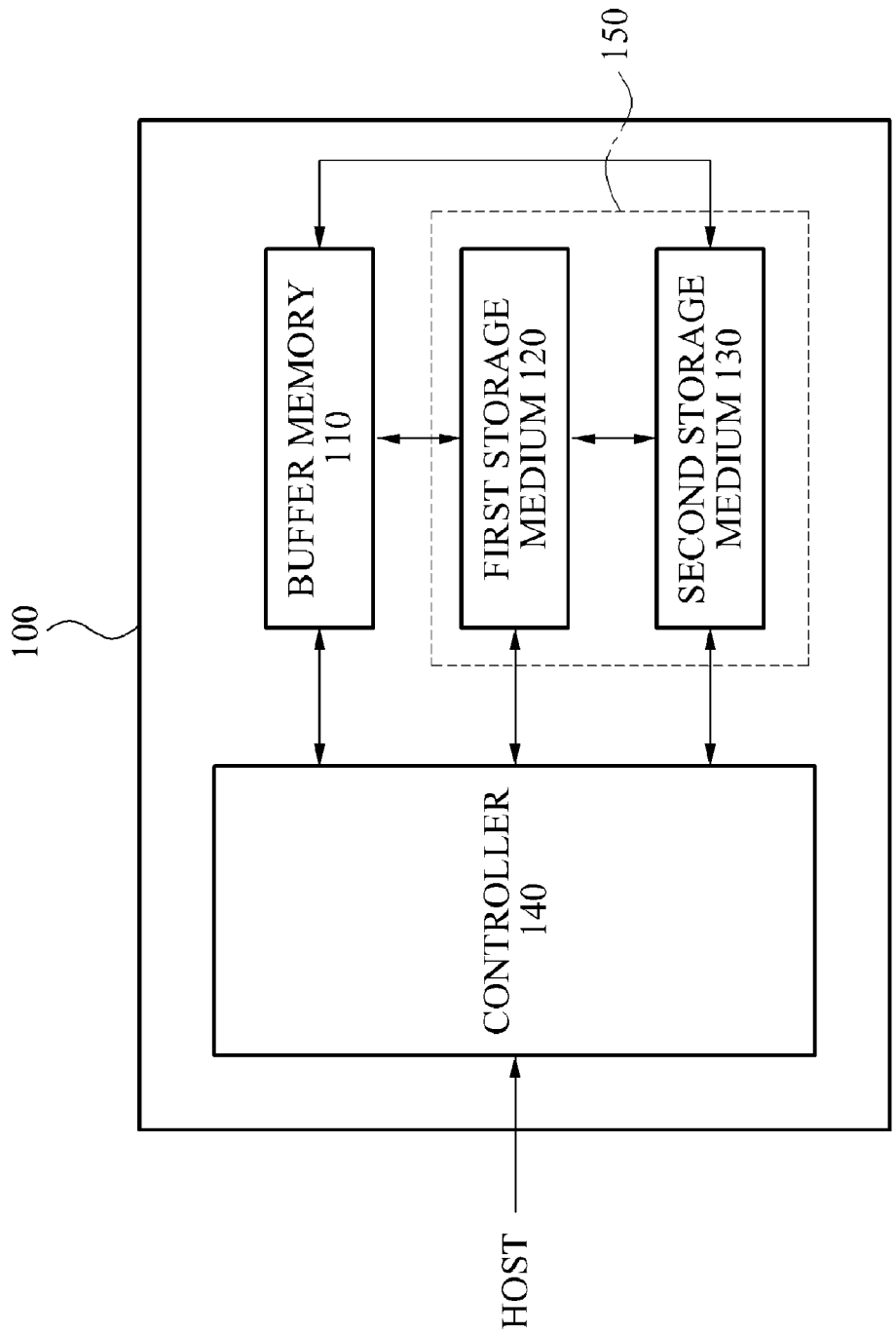
FIG. 1 is a diagram illustrating a configuration of an example of a data storage device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a configuration of an example of a data storage device 100. The data storage device 100 includes a buffer memory 110, a storage medium 150, and a controller 140.

The buffer memory 110 may sequentially store written data that is received from a host to the data storage device 100.

The buffer memory 110 may be provided on a main board or a chipset associated with the host.

The storage medium 150 may include at least one drive. The controller 140 calculates first parity data corresponding to data selected from the written data, and generates journaling data for the selected data and the first parity data. The controller 140 controls the generated journaling data to be stored in the storage medium 150.

The controller 140 may control latest valid data, collected from the journaling data, to be stored in the storage medium 150.

The storage medium 150 may include a first storage medium 120 to store the journaling data, and a second storage medium 130 to store the latest valid data.

The first storage medium 120 and the second storage medium 130 may be the same type of a redundant array of independent disks (RAID)-based storage medium that includes at least one drive such as solid state drive (SSD), hard disk drive (HDD), or Memory Devices, for example, and may be logically separable from each other.

The first storage medium 120 and the second storage medium 130 may be different types of storage mediums. For example, the first storage medium 120 may be at least one solid state drive (SSD) or hard disk drive (HDD). The second storage medium 120 may be another at least one SSD or HDD. Other suitable types of storage mediums may be used, as well.

The buffer memory 110 may be located within the host. Also, the buffer memory 110 may be located within the same package as the first storage medium 120 or the second storage medium 130.

The controller 140 may retrieve latest valid data from the journaling data stored in the first storage medium 120 and data stored in the second storage medium 130 to calculate latest second parity data of the latest valid data.

The buffer memory 110 may function to buffer a speed difference between a storage medium with a relatively fast data access speed and a storage medium with a relatively slow data access speed.

The controller 140 may control a stripe containing the latest second parity data and the latest valid data to be stored in the second storage medium 130.

The controller 140 may select data that is selected from the written data based on a predetermined data block unit, and calculate the first parity based on the predetermined data block unit.

The first storage medium 120 may include a journaling area to store the journaling data, and a log data area to store log data that contains metadata of the selected data and the first parity data. In this case, the controller 140 may overwrite the log data in the log data area.

The log data may include at least one of storage location information in the journaling area, storage location information in the second storage medium 130, data update information, and storage time information of the selected data and the first parity data.

For example, the log data may be metadata that includes management information associated with the selected data and the first parity data.

The controller 140 may analyze the latest valid data based on the selected data and the first parity data constituting the journaling data stored in the first storage medium 120, and existing data stored in the second storage medium 130.

The controller 140 may calculate the latest second parity data based on the latest valid data and the journaling data that is temporarily stored in the buffer memory 110. The controller 140 may control the latest second parity data to be temporarily stored in the buffer memory 110.

After storing the latest valid data in the second storage medium 130, the controller 140 may invalidate or erase the first parity data and the selected data of the first storage medium 120 corresponding to the latest valid data.

Also, the controller 140 may remap the address of the latest second parity data and the latest valid data of the second storage medium 130 to the addresses of the previously existing second parity data and the previously existing data that are invalidated by the latest second parity and the latest valid data.

After remapping the addresses of the latest second parity data and the latest valid data stored in the second storage medium, the controller 140 may invalidate or erase the previously existing second parity data and the previously existing data stored in the second storage medium 130.

Where a size of the selected data does not match a stripe size, the controller 140 may include padding data to generate the journaling data matching the stripe size. An example of a data storage device is further described with reference to FIGS. 2 through 4 below.

Figure 2:
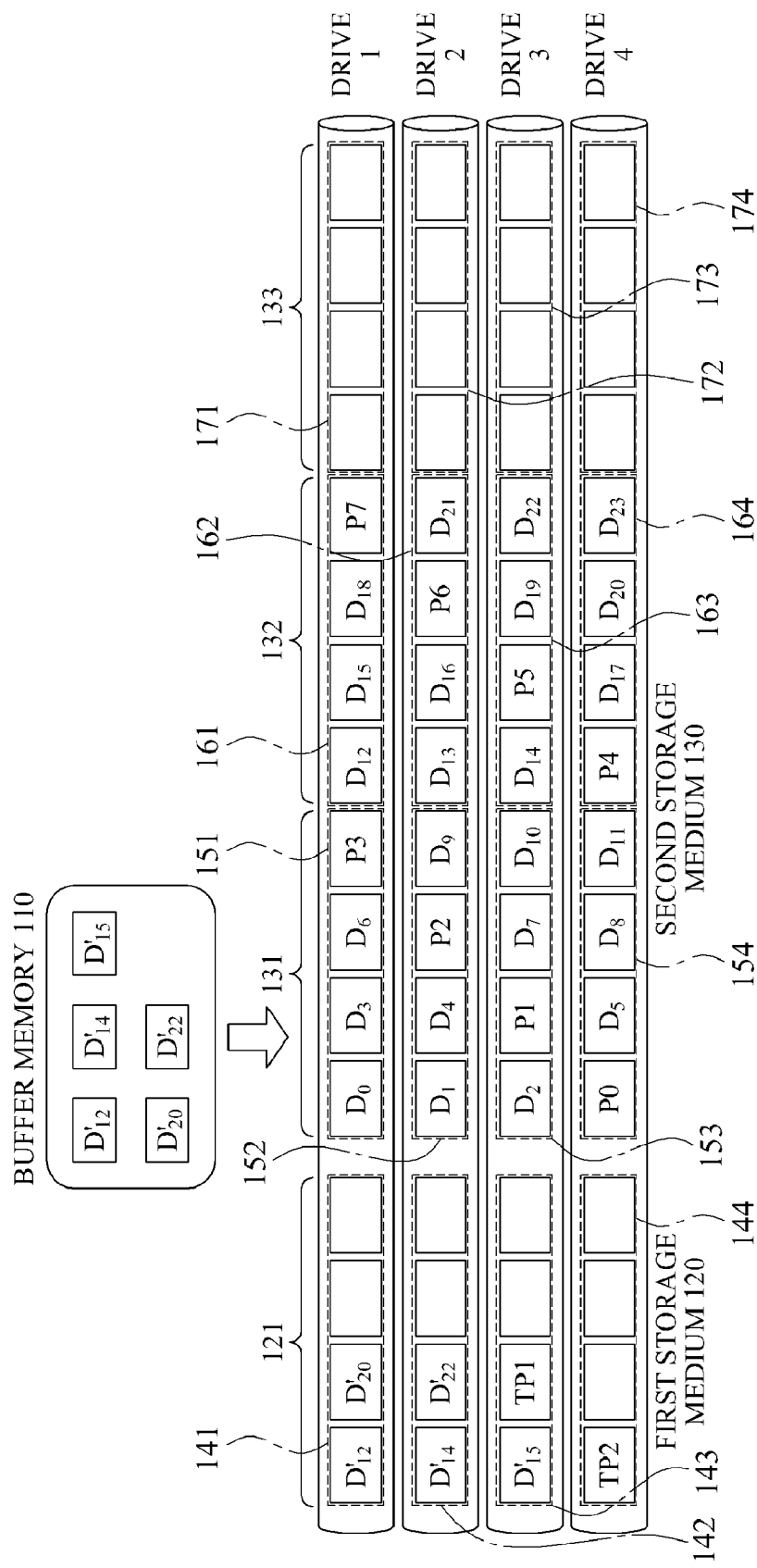
FIG. 2 is a diagram illustrating an example of a process of generating journaling data in the data storage device of FIG. 1.
Figure 3:
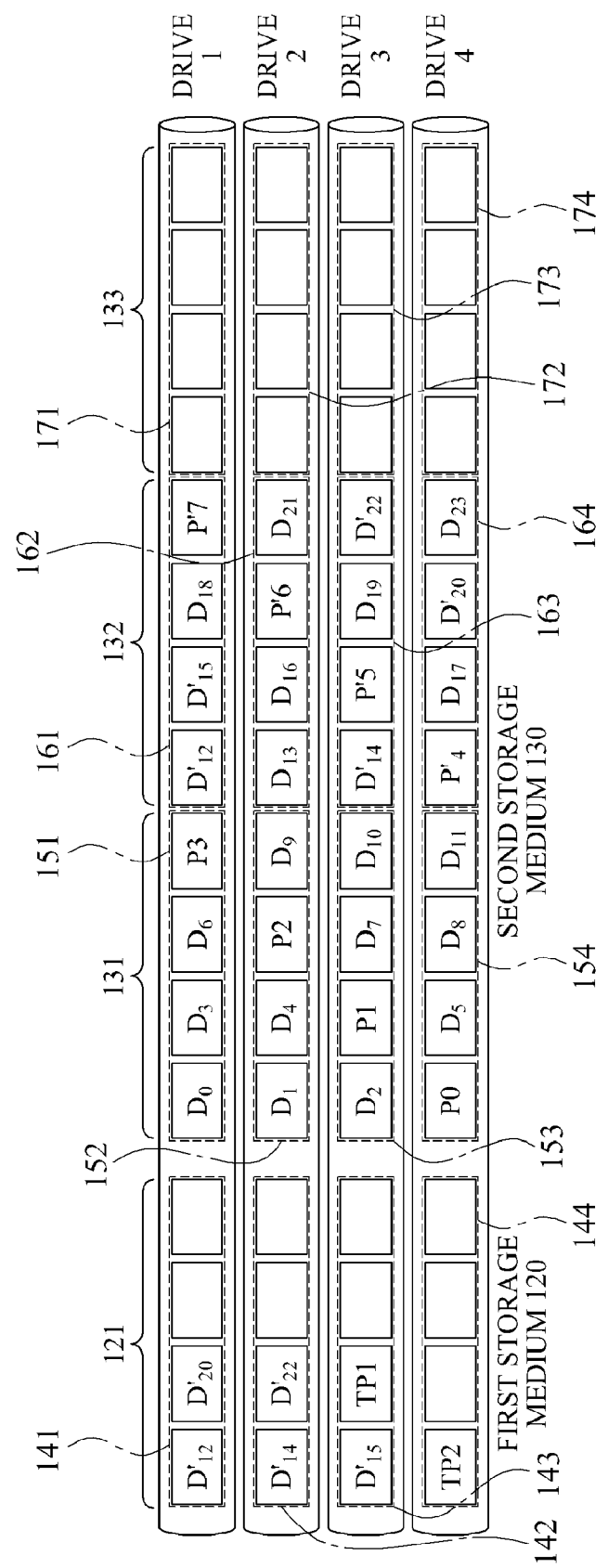
FIG. 3 is a diagram illustrating an example of a process of generating second parity data in the data storage device of FIG. 1.
Figure 4:
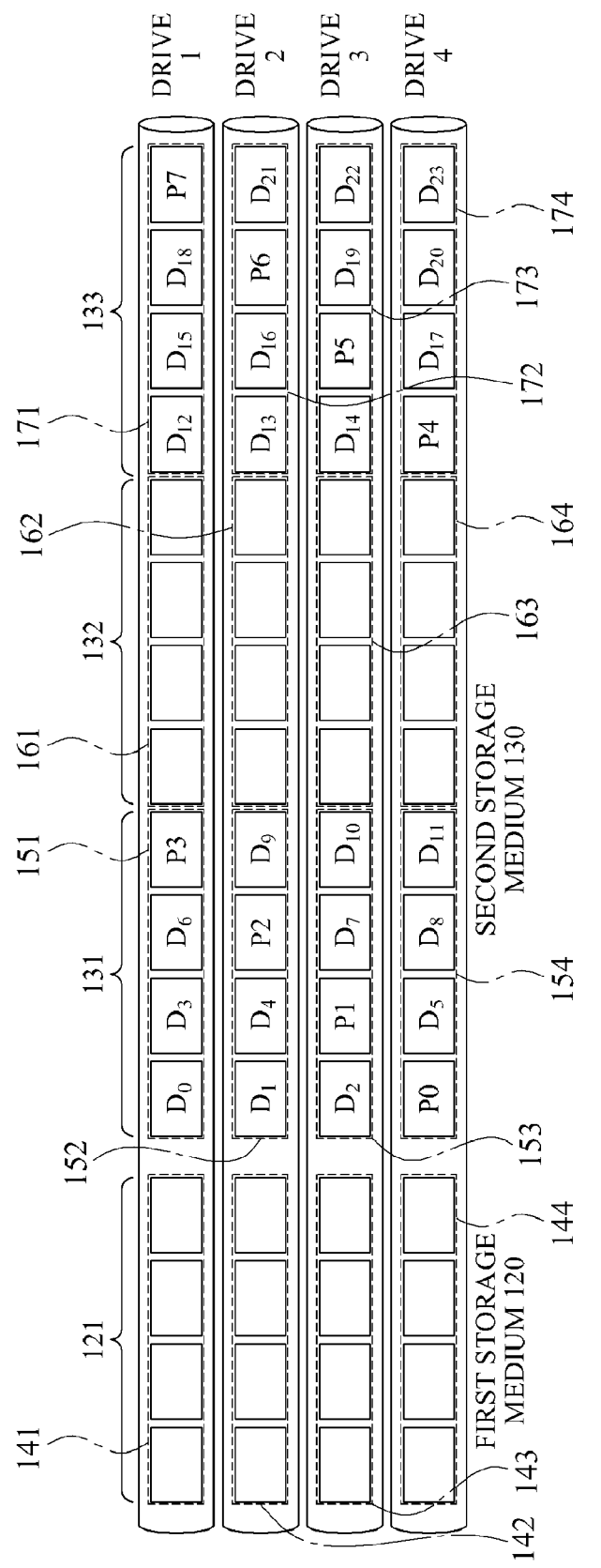
FIG. 4 is a diagram illustrating an example of a process of remapping in the data storage device of FIG. 1.

FIGS. 2 through 4 illustrate an example of a data storage structure in a data storage device. FIG. 2 illustrates an example of a process of generating journaling data in the data storage device 100 of FIG. 1.

Referring to FIG. 2, the buffer memory 110 may sequentially store written data that is received from the host. Presuming data $D'_{12}$, $D'_{14}$, $D'_{15}$, $D'_{20}$, and $D'_{22}$ are selected from the written data stored in the buffer memory 110, the controller 140 may calculate first parity data corresponding to the selected data $D'_{12}$, $D'_{14}$, $D'_{15}$, $D'_{20}$, and $D'_{22}$, and generate journaling data of the selected data $D'_{12}$, $D'_{14}$, $D'_{15}$, $D'_{20}$, and $D'_{22}$ and the first parity data.

The term "block" defined herein may denote a storage space constructed as a minimum unit to read and write data, or to manage the data. The term "data block" defined here may denote a block that includes the data.

The first storage medium 120 may include at least one EraseBlock that includes a set of data blocks, and may also include an EraseBlock group which includes EraseBlocks, each of which is selected from each drive. For example, referring to FIG. 2, the first storage medium 120 may include EraseBlocks 141, 142, 143, and 144, and may also include an EraseBlock group 121 that includes the EraseBlocks 141, 142, 143, and 144 selected from drives 1, 2, 3, and 4, respectively.

The second storage medium 130 may include at least one EraseBlock that is a set of data blocks being continuous within at least one drive, and may also include at least one EraseBlock group which includes EraseBlocks, each of which is selected from each drive. For example, referring to FIG. 2, the second storage medium 130 may include Erase-Blocks 151, 152, 153, and 154, 161, 162, 163, and 164, and 171, 172, 173, and 174 that are a set of data blocks within the drives 1, 2, 3, and 4, respectively, and may also include EraseBlock groups 131, 132, and 133 that include the Erase-Blocks 151, 152, 153, and 154, 161, 162, 163, and 164, and 171, 172, 173, and 174, respectively, that are selected from the drives 1, 2, 3, and 4, respectively.

The term "EraseBlock" may be a minimum unit to erase data, for example.

A number of the EraseBlocks 141, 142, 143, 144, 151, 152, 153, 154, 161, 162, 163, 164, 171, 172, 173, and 174 is discussed only to illustrate an example, and is not limiting.

In FIG. 2, the controller 140 may calculate first parity data blocks TP1 and TP2 corresponding to selected data blocks $D'_{12}$, $D'_{14}$, $D'_{15}$, $D'_{20}$, and $D'_{22}$, and may control journaling data of the selected data blocks $D'_{12}$, $D'_{14}$, $D'_{15}$, $D'_{20}$, and $D'_{22}$, and the first parity data blocks TP1 and TP2 to be stored in the EraseBlock group 121 of the first storage medium 120.

The journaling data may be stored in a form of a stripe.

Although not illustrated in FIG. 2, the first storage medium 120 may also include a journaling area to store the journaling data, and a log data area to store log data of the selected data blocks $D'_{12}$, $D'_{14}$, $D'_{15}$, $D'_{20}$, and $D'_{22}$, and the first parity data blocks TP1 and TP2.

Each of the journaling area and the log data area may include at least one EraseBlock group. The EraseBlock group 121 storing the journaling data may be included in the journaling area.

The log data may include at least one of storage location information in the journaling data, storage location information in the second storage medium 130, data update information, and storage time information of the selected data blocks $D'_{12}$, $D'_{14}$, $D'_{15}$, $D'_{20}$, and $D'_{22}$, and the first parity data blocks TP1 and TP2. Although it is not illustrated, the log data may be stored in a predetermined EraseBlock included in the log data area of the first storage medium 120.

The controller 140 may store the selected data blocks $D'_{12}$, $D'_{14}$, $D'_{15}$, $D'_{20}$, and $D'_{22}$, and the first parity data blocks TP1 and TP2 while alternately rotating the drives 1, 2, 3, and 4 sequentially after a block that is stored last in the journaling area.

If there is not enough storage space available in an Erase-Block to store the selected data blocks $D'_{12}$, $D'_{14}$, $D'_{15}$, $D'_{20}$, and $D'_{22}$, and the first parity data blocks TP1 and TP2 constituting stripes, the controller 140 may sequentially store the remainder of the stripes into another Eraseblock in the journaling area.

The controller 140 may control the log data to be stored in the log data area. The controller 140 may also control the log data to be redundantly stored in more than one drives, for example, the drives 1 and 2. In this case, where any one drive malfunctions, the controller 140 may recover the log data from another drive.

The controller 140 may store the log data in the log data area before writing the log data in a selected data block, and may also store the log data before or after writing the log data in the selected data block.

Where a size of the journaling data does not match a stripe size to store the selected data blocks $D'_{12}$, $D'_{14}$, $D'_{15}$, $D'_{20}$, and $D'_{22}$, and the first parity data blocks TP1 and TP2 as the journaling data based on a stripe unit, the controller 140 may include padding data to make the size of the journaling data match the stripe size. The padding data may be a data block having a predetermined size, and may not include any meaningful information.

The controller 140 may control the selected data blocks $D'_{12}$, $D'_{14}$, $D'_{15}$, $D'_{20}$, and $D'_{22}$, and the first parity data blocks TP1 and TP2 to be written in a random order.

For example, in each of stripes for journaling data, the controller 140 may control a first parity data block to be stored after a selected data block, and may also control the first parity data block to be written prior to the selected data block or to be stored between selected data blocks.

The controller 140 may control the first parity block to be stored according to a scheme of rotating a location of a drive where the first parity block for each stripe is to be stored.

The second storage medium 130 may include one or more EraseBlock groups, for example, EraseBlock groups 131 and 132 to store existing data that is garbage collected from the first storage medium 120.

Referring to FIG. 2, the EraseBlock group 131 of the second storage medium 130 may contain existing data blocks $D_0$, $D_1$, $D_2$, $D_3$, $D_4$, $D_5$, $D_6$, $D_7$, $D_8$, $D_9$, $D_{10}$, and $D_{11}$, and parity blocks P0, P1, P2, and P3 that are the parities of the existing data blocks $D_0$, $D_1$, $D_2$, $D_3$, $D_4$, $D_5$, $D_6$, $D_7$, $D_8$, $D_9$, $D_{10}$, and $D_{11}$.

The parity block P0 may be parity data of the existing data blocks $D_0$, $D_1$, and $D_2$. The parity block P1 may be parity data of the existing data blocks $D_3$, $D_4$, and $D_5$. The parity block P2 may be parity data of the existing data blocks $D_6$, $D_7$, and $D_8$. The parity block P3 may be parity data of $D_9$, $D_{10}$, and $D_{11}$.

The EraseBlock group 132 of the second storage medium 130 may store existing data blocks $D_{12}$, $D_{13}$, $D_{14}$, $D_{15}$, $D_{16}$, $D_{17}$, $D_{18}$, $D_{19}$, $D_{20}$, $D_{21}$, $D_{22}$, and $D_{23}$, and parity blocks P4, P5, P6, and P7 for the existing data blocks $D_{12}$, $D_{13}$, $D_{14}$, $D_{15}$, $D_{16}$, $D_{17}$, $D_{18}$, $D_{19}$, $D_{20}$, $D_{21}$, $D_{22}$, and $D_{23}$.

The parity block P4 may be parity data of the existing data blocks $D_{12}$, $D_{13}$, and $D_{14}$. The parity block P5 may be parity data of the existing data blocks $D_{15}$, $D_{16}$, and $D_{17}$. The parity block P6 may be parity data of the existing data blocks $D_{18}$, $D_{19}$, and $D_{20}$. The parity block P7 may be parity data of the existing data blocks $D_{21}$, $D_{22}$, and $D_{23}$.

FIG. 3 illustrates an example of a process of generating the latest second parity data in the data storage device 100 of FIG. 1.

The controller 140 may retrieve valid data with respect to journaling data stored in the first storage medium 120, and data stored in the second storage medium 130, and may calculate the latest second parity data corresponding to the latest valid data.

Referring to FIG. 3, the controller 140 may analyze and retrieve valid data blocks from selected data blocks $D'_{12}$, $D'_{14}$, $D'_{15}$, $D'_{20}$, and $D'_{22}$, and first parity data blocks TP1 and TP2 that constitute the journaling data and are stored in an Erase-Block group 121, and existing data blocks $D_0$ through $D_{23}$, and parity blocks P0 through P7 of the existing data blocks $D_0$ through $D_{23}$ that are stored in EraseBlock groups 131 and 132.

Since the selected data blocks $D'_{12}$, $D'_{14}$, $D'_{15}$, $D'_{20}$, and $D'_{22}$ are the latest data in comparison with the existing data blocks $D_{12}$, $D_{14}$, $D_{15}$, $D_{20}$, and $D_{22}$ that are destined for the same address as for the selected data blocks $D'_{12}$, $D'_{14}$, $D'_{15}$, $D'_{20}$, and $D'_{22}$, respectively, the controller 140 may invalidate the obsolete data blocks $D_{12}$, $D_{14}$, $D_{15}$, $D_{20}$, and $D_{22}$. For example, if there are more than one different data blocks for an identical address, only a most recently stored data block may be a valid block and a remaining data block may be marked as an invalid data block.

The invalid data block may be data that is unused by a user and thus may be discarded. For example, valid data blocks in the EraseBlock group 121 and the EraseBlock group 132 may be the data blocks $D'_{12}$, $D_{13}$, $D'_{14}$, $D'_{15}$, $D_{16}$, $D_{17}$, $D_{18}$, $D_{19}$, $D'_{20}$, $D_{21}$, and $D'_{22}$.

In one example, as shown in FIG. 2, the parity block P4 may be parity data of the existing data blocks $D_{12}$, $D_{13}$, and $D_{14}$. However, the parity block P4 is not parity data of the valid data blocks $D'_{12}$, $D_{13}$, and $D'_{14}$ as shown in FIG. 3. Accordingly, the controller 140 may determine whether each data block is valid or invalid. Because data blocks $D_{12}$ and $D_{14}$ are invalid data blocks in FIG. 3, the controller may control the parity data block P4, which includes parity data of the invalid data blocks $D_{12}$ and $D_{14}$, to be invalidated. The controller may then control the parity block P4 to be updated to a new parity data block P'4 that is the parity data of the valid data blocks $D'_{12}$, $D_{13}$, and $D'_{14}$.

For the same reason, the controller 140 may control the parity data blocks P5, P6, and P7 to be invalidated and to be updated to parity data blocks P'5, P'6, and P'7.

In FIG. 3, the controller 140 may retrieve the valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$ and $D_{23}$, which are selected from the journaling data $D'_{12}$, $D'_{14}$, $D'_{15}$, $D'_{20}$, and $D'_{22}$ in the EraseBlock group 121 and the existing data blocks $D_{12}$, $D_{13}$, $D_{14}$, $D_{15}$, $D_{16}$, $D_{17}$, $D_{18}$, $D_{19}$, $D_{20}$, $D_{21}$, $D_{22}$, and $D_{23}$ in the EraseBlock group 132.

The controller 140 may calculate the latest second parity data block of the latest valid data block, and may control the stripes including the latest valid data block and the latest second parity data block to be stored in the second storage medium 130.

Depending on embodiments, the controller 140 may read journaling data $D'_{12}$, $D'_{14}$, $D'_{15}$, $D'_{20}$, and $D'_{22}$ of the EraseBlock group 121 using the buffer memory 110, and may analyze data blocks included in the EraseBlock groups 121, 131, and 132 to thereby read, using the buffer memory 110, the valid data blocks $D_{13}$, $D_{16}$, $D_{17}$, $D_{18}$, $D_{19}$, $D_{21}$, and $D_{23}$ that are stored in the second storage medium 130.

The controller 140 may not read, using the buffer memory 110, the valid data blocks $D_{13}$, $D_{16}$, $D_{17}$, $D_{18}$, $D_{19}$, $D_{21}$, and $D_{23}$ that are stored in the second storage medium 130.

The controller 140 may generate the latest second parity data blocks P'4, P'5, P'6, and P'7 based on the latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$ for each stripe.

The second parity data block P'4 may be parity data of the data blocks $D'_{12}$, $D_{13}$, and $D'_{14}$. The second parity data block P'5 may be parity data of the data blocks $D'_{15}$, $D_{16}$, and $D_{17}$. The second parity data block P'6 may be parity data of the data blocks $D_{18}$, $D_{19}$, and $D'_{20}$. The second parity data blocks P'7 may be parity data of the data blocks $D_{21}$, $D'_{22}$, and $D_{23}$.

According to an example of an embodiment, the controller 140 may control the latest second parity data blocks P'4, P'5, P'6, and P'7 to be stored in the buffer memory 110 prior to being stored in the second storage medium 130.

The controller 140 may also control the latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the latest second parity data blocks P'4, P'5, P'6, and P'7 of the valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$ to be stored in the second storage medium 130 and to be updated.

Also, the controller 140 may control all the latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the latest second parity data blocks P'4, P'5, P'6, and P'7 to be sequentially stored in spaces corresponding to addresses of the data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and P'4, P'5, P'6, and P'7 of the EraseBlock group 132 of the second storage medium 130, respectively, according to characteristics of the second storage medium 130.

The controller 140 may read the valid data blocks $D_{13}$, $D_{16}$, $D_{17}$, $D_{18}$, $D_{19}$, $D_{21}$, and $D_{23}$, and then control the read valid data $D_{13}$, $D_{16}$, $D_{17}$, $D_{18}$, $D_{19}$, $D_{21}$, and $D_{23}$ to be overwritten in the same locations of the second storage medium 130 as the same data.

The controller 140 may control the latest data blocks $D'_{12}$, $D'_{14}$, $D'_{15}$, $D'_{20}$, and $D'_{22}$ of the first storage medium 120, and the latest second parity data blocks P'4, P'5, P'6 to be stored in spaces corresponding to the addresses of the previously existing datablocks $D_{12}$, $D_{14}$, $D_{15}$, $D_{20}$, and $D_{22}$ and the previously existing second parity blocks P4, P5, and P6 stored in the second storage medium 130, respectively, without overwriting the unmodified data blocks $D_{13}$, $D_{16}$, $D_{17}$, $D_{18}$, $D_{19}$, $D_{21}$, and $D_{23}$ of the second storage medium 130 into the second storage medium 130.

The controller 140 may control the valid data blocks $D'_{12}$, $D'_{14}$, $D'_{15}$, and $D'_{20}$ of the first storage medium 120 to be stored to the second storage medium 130 and then control the valid data blocks $D'_{12}$, $D'_{14}$, $D'_{15}$, and $D'_{20}$, and the first parity data blocks TP1 and TP2 of the first storage medium 120 to be invalidated or erased.

Where valid data blocks of the second storage medium 130 are to be read in order to generate the latest second parity data blocks, read operations for a garbage collection may be combined with read operations used for the latest second parity data blocks. Accordingly, it is possible to reduce overhead by decreasing a number of inputs/outputs used for the generation of the latest second parity blocks.

It may be presumed, for example, that the controller 140 stores selected data in the first storage medium 120. Based on an analysis, in comparison with the aforementioned scheme of storing the selected data in the first storage medium 120 and then re-storing the selected data in the second storage medium 130, it may be more effective to directly store the selected data in the second storage medium 130 without storing the selected data in the first storage medium. In this case, the controller 140 may control the selected data to be directly stored in the second storage medium 130.

For example, where a number of valid blocks in the EraseBlock group 132 of the second storage medium 130 is less than a predetermined value, the controller 140 may control new blocks that are to be stored in the EraseBlock group 132 to be directly stored in the second storage medium 130 instead of storing the new blocks in the first storage medium 120.

FIG. 4 illustrates an example of a remapping process in the data storage device 100.

After storing valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the latest second parity data blocks P'4, P'5, P'6, and P'7 in an EraseBlock group 133 of the second storage medium 130, the controller 140 may control the address of the latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the second parity data blocks P'4, P'5, P'6, and P'7 to be remapped to the address of the previously existing data blocks $D_{12}$, $D_{13}$, $D_{14}$, $D_{15}$, $D_{16}$, $D_{17}$, $D_{18}$, $D_{19}$, $D_{20}$, $D_{21}$, $D_{22}$, and $D_{23}$ and the previously existing second parity blocks P4, P5, P6, and P7 stored in the obsolete Eraseblock group 132.

For example, the controller 140 may control the remapped latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the latest second parity data blocks P'4, P'5, P'6, and P'7 to be stored in the second storage medium 130.

After the above remapping process, the controller 140 may invalidate the previously existing data blocks $D_{12}$, $D_{13}$, $D_{14}$, $D_{15}$, $D_{16}$, $D_{17}$, $D_{18}$, $D_{19}$, $D_{20}$, $D_{21}$, $D_{22}$, and $D_{23}$ and the previously existing second parity data blocks P4, P5, P6, and P7 of the obsolete EraseBlock 132 in the second storage medium 130.

Referring to FIG. 4, where the controller 140 desires to write the latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the latest second parity data blocks P'4, P'5, P'6, and P'7 in the second storage medium 130, the controller 140 may control the latest valid data blocks $D'_{12}$, $D_{13}$, $D'_{14}$, $D'_{15}$, $D_{16}$, $D_{17}$, $D_{18}$, $D_{19}$, $D'_{20}$, $D_{21}$, $D'_{22}$, and $D_{23}$, and the latest second parity data blocks P'4, P'5, P'6, and P'7 to be written in the EraseBlock group 133, instead of in the EraseBlock group 132. For example, the controller 140 may control remapping the address of the EraseBlock group 132 to the EraseBlock group 133.

Before this remapping cycle, the EraseBlock group 133 may belong to a separate storage space unseen by the user. That is, the EraseBlock group 133 may belong to the log data area of the second storage medium 130. The log data area may include at least one EraseBlock.

After the above remapping is performed, the EraseBlock group 132 may be inserted into the log data area unseen by the user.

After the remapping process, the controller 140 may control the obsolete data blocks $D_{12}$, $D_{13}$, $D_{14}$, $D_{15}$, $D_{16}$, $D_{17}$, $D_{18}$, $D_{19}$, $D_{20}$, $D_{21}$, $D_{22}$, and $D_{23}$, and the obsolete second parity data blocks P4, P5, P6, and P7 of the obsolete Eraseblock 132 of the second storage medium 130 to be invalidated or erased.

A data storage device may integrally manage memory management functions to readily embody a system-in package (SiP).

Data storage devices and/or controllers may be embodied using various types of packages. For example, the data storage devices and/or controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like. However, the data storage devices and/or controllers are not limited to these examples.

A data storage device may stably control data using parity data in a temporary storage space prior to storing the data in a final storage medium.

In addition, a data storage device may combine a read process of a garbage collection with a read process used for a parity calculation to decrease a number of inputs/output used for the parity calculation and thereby reduce overhead.

A data storage device may also manage a cache in a matrix structure. Therefore, in the case of logging-up, the data storage device may read used data and store the entire matrix cache in a final storage space.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data storage device comprising:
   a buffer memory configured to sequentially store data blocks that are received from a host;
   a storage medium comprising a first storage medium and a second storage medium; and
   a controller configured to calculate first parity data for data that is selected from the data blocks stored in the buffer memory, generate journaling data including the selected data and the first parity data, store the journaling data in the first storage medium, collect garbage data from the journaling data, store the garbage data in the second storage medium, and collect latest valid data from the journaling data stored in the first storage medium and garbage data stored in the second storage medium to calculate second parity data of the latest valid data,
   wherein the controller combines read operations for collecting the garbage data and collecting the latest valid data.

2. The data storage device of claim 1, wherein the first storage medium and the second storage medium are the same type of a redundant array of independent disks (RAID)-based storage medium that includes one or more drives, and are logically separable from each other.

3. The data storage device of claim 1, wherein the controller controls the latest valid data and the second parity data to be stored in the second storage medium.

4. The data storage device of claim 1, wherein the first storage medium includes a journaling area to store the journaling data, and a log data area to store log data that contains metadata of the selected data and the first parity data.

5. The data storage device of claim 4, wherein the controller controls the log data to be overwritten in the log data area.

6. The data storage device of claim 4, wherein the log data includes at least one of storage location information within the journaling area, storage location information within the second storage medium, data update information, and storage time information with respect to the selected data and the first parity data.

7. The data storage device of claim 1, wherein the controller analyzes the latest valid data based on the selected data and the first parity data constituting the journaling data stored in the first storage medium, and existing data stored in the second storage medium.

8. The data storage device of claim 1, wherein the controller calculates the second parity data based on the latest valid data and journaling data that is temporarily stored in the buffer memory.

9. The data storage device of claim 3, wherein, after storing the latest valid data in the second storage medium, the controller invalidates the first parity data and the selected data stored in the first storage medium.

10. The data storage device of claim 3, wherein the controller remaps addresses of latest second parity data and the latest valid data of the second storage medium to addresses of previously existing second parity data and previously existing data that are invalidated by the latest second parity and the latest valid data.

11. The data storage device of claim 10, wherein, after remapping the addresses of the latest second parity data and the latest valid data stored in the second storage medium, the controller invalidates or erases the previously existing second parity data and the previously existing data stored in the second storage medium.

12. The data storage device of claim 1, wherein, when a size of the selected data does not match a stripe size, the controller includes padding data to generate the journaling data matching the stripe size.

13. A data storage method comprising:
sequentially storing, in a buffer memory, data blocks that are received from a host;
calculating first parity data for data that is selected from the data blocks stored in the buffer memory,
generating journaling data including the selected data and the first parity data
storing the generated journaling data in a first storage medium that includes at least one drive;
collecting garbage data from the journaling data, and storing the garbage data in a second storage medium; and
collecting latest valid data from the journaling data stored in the first storage medium and garbage data stored in the second storage medium to calculate second parity data of the latest valid data,
wherein the controller combines read operations for collecting the garbage data and collecting the latest valid data.

* * * * *